(12) United States Patent
Jolly et al.

(10) Patent No.: US 11,238,869 B2
(45) Date of Patent: Feb. 1, 2022

(54) SYSTEM AND METHOD FOR RECONSTRUCTING METADATA FROM AUDIO OUTPUTS

(71) Applicant: Red Box Recorders Limited, Nottinghamshire (GB)

(72) Inventors: Simon Jolly, Nottingham (GB); Tony Commander, Manchester (GB); Kyrylo Zotkin, Kyiv (UA); Liam Gulliver, Loughborough (GB)

(73) Assignee: RED BOX RECORDERS LIMITED, Nottinghamshire (GB)

( * ) Notice: Subject to any disclaimer, the term of this patent is extended or adjusted under 35 U.S.C. 154(b) by 55 days.

(21) Appl. No.: 16/593,348

(22) Filed: Oct. 4, 2019

(65) Prior Publication Data
US 2021/0104246 A1   Apr. 8, 2021

(51) Int. Cl.
| | | |
|---|---|---|
| *G10L 17/00* | (2013.01) | |
| *G10L 17/06* | (2013.01) | |
| *G10L 17/02* | (2013.01) | |
| *G06F 40/169* | (2020.01) | |

(52) U.S. Cl.
CPC ............ *G10L 17/00* (2013.01); *G06F 40/169* (2020.01); *G10L 17/02* (2013.01); *G10L 17/06* (2013.01)

(58) Field of Classification Search
CPC ........ G10L 17/00; G10L 17/02; G06F 40/169
USPC ............................ 704/235; 707/999; 455/420
See application file for complete search history.

(56) References Cited

U.S. PATENT DOCUMENTS

| | | | |
|---|---|---|---|
| 8,335,687 B1 | 12/2012 | Reding et al. | |
| 2006/0112124 A1* | 5/2006 | Ando | ................... G11B 27/034 |
| 2006/0239130 A1* | 10/2006 | Momosaki | .......... G06F 16/7834 |
| | | | 369/1 |
| 2007/0233725 A1* | 10/2007 | Michmerhuizen | ...... G10L 13/08 |
| 2011/0212717 A1* | 9/2011 | Rhoads | ............... G06F 16/9554 |
| | | | 455/420 |
| 2015/0006171 A1* | 1/2015 | Westby | ................... G10L 15/26 |
| | | | 704/235 |
| 2019/0066693 A1* | 2/2019 | Ziv | ......................... G10L 17/00 |

* cited by examiner

*Primary Examiner* — Akwasi M Sarpong
(74) *Attorney, Agent, or Firm* — Katten Muchin Rosenman LLP

(57) ABSTRACT

The disclosed invention provides system and method to reconstruct metadata of audio outputs in which portions of metadata are missing. The system and method of the disclosed invention utilizes characteristics of speakers in audio outputs, voiceprints to identify speakers, and transcripts of the audio outputs to further analyze the audio outputs through machine learning process. The metadata reconstruction system performs operations that include isolating the metadata of the audio output, detecting missing portions of the metadata, detecting characteristics of speakers involved in the audio output, identifying the speakers from the characteristics of the speakers by utilizing voiceprints of speakers, creating a transcript of the audio output, analyzing the transcript by using natural language processing (NLP), annotating the transcript with identified speakers, constructing metadata with the identified speakers and results of the analysis of the transcript, and recombining the constructed metadata with the audio output to produce reconstructed audio output.

20 Claims, 6 Drawing Sheets

SYSTEM AND METHOD FOR RECONSTRUCTING METADATA FROM AUDIO OUTPUTS

BACKGROUND

Audio recordings, which are without metadata or with missing metadata have disadvantages for obtaining information contained in the audio contents compared to audio recordings that include metadata in which contents are metadata-tagged. With various reasons, metadata for audios could be missing. For example, recording of audios may begin before metadata is associated with the voice-captured output (i.e. files). Though spoken words may remain fairly reliable when listening to a conversation, acquiring information of recorded audios could be a challenge without metadata. Audio recordings without metadata may not be able provide information such as when the conversation happened, who was speaking, and applicable sentiment during the conversation.

Traditionally metadata restoration might have been done in isolated circumstances where post-processing of a recording is required. For example, adding metadata about when the file was created, or which hardware or software was used to create the file, or perhaps pulling in respective user-information that created the file may be required. These examples concern the most straightforward techniques to resolve metadata deficiency using standard computer network environment techniques and possibly advanced macros. Other restoration techniques may be used to analyze an audio file and update the metadata accordingly. In these techniques, data-points, which might include bit stream, duration, etc., may be analyzed. However, even in these techniques, data concerning, for example, how many speakers presented, who spoke the most, etc. are less common data restoration examples.

SUMMARY

The disclosed invention provides system and method to reconstruct or restore metadata of audio processing. The system and method utilize technique to extract data from the audio source to construct metadata. Data may include characteristics such as speaker-identity, transcript, sentiment analysis, language spoken, etc. The system and method utilizes characteristics of speakers in audio outputs, voiceprints to identify speakers, and transcripts of the audio outputs to further analyze the audio outputs through machine learning process.

These and others advantages may be provided by, for example, a system for reconstructing metadata of an audio output that is output from one or more audio sources. The metadata reconstruction system is coupled with the one or more audio sources and one or more databases including voiceprints of users. The system includes at least one non-transitory storage medium to store executable instructions, and at least one processor to execute the executable instructions that cause the at least one processor to perform operations to reconstruct the metadata of the audio output. The operations includes isolating the metadata of a recorded conversation of the audio output, detecting missing portions of the metadata from the isolated metadata, detecting characteristics of speakers involved in the audio output, identifying the speakers from the characteristics of the speakers, creating a transcript of the audio output, analyzing the transcript by using natural language processing (NLP), annotating the transcript with identified speakers, construct- ing metadata with the identified speakers and results of the analysis of the transcript, in which the missing portions of the metadata is replaced with the constructed metadata, and recombining the constructed metadata with the audio output to produce reconstructed recorded conversation.

The audio output may be a recorded audio stream. The audio output may be an audio stream produced in real time by the one or more audio sources. The audio output may be an audio stream produced in non-real time by the one or more audio sources. The identifying the speakers may include accessing the one or more databases to retrieve the voiceprints of users, and matching the characteristics of the speakers in the audio output with the voiceprints. The characteristics of the speakers may include frequencies, amplitudes and durations of voices of the speakers. The analyzing the transcript may include detecting sentiments of the speakers by using the NLP. The operation may further include detecting intervals between words in the audio output for each speaker to determine responsiveness and stress level of the speaker. The operation may further include detecting languages of the audio output. The operation may further include recognizing entities that includes names and personal information attributable to the speakers.

These and others advantages may be also provided by, for example, a method for reconstructing metadata of an audio output that is output from one or more audio sources. The method includes isolating the metadata of a recorded conversation of the audio output, detecting missing portions of the metadata from the isolated metadata, detecting characteristics of speakers involved in the audio output, identifying the speakers from the characteristics of the speakers, creating a transcript of the audio output, analyzing the transcript by using natural language processing (NLP), annotating the transcript with identified speakers, constructing metadata with the identified speakers and results of the analysis of the transcript, in which the missing portions of the metadata is replaced with the constructed metadata, and recombining the constructed metadata with the audio output to produce reconstructed recorded conversation.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTIONS

Figure 1A:
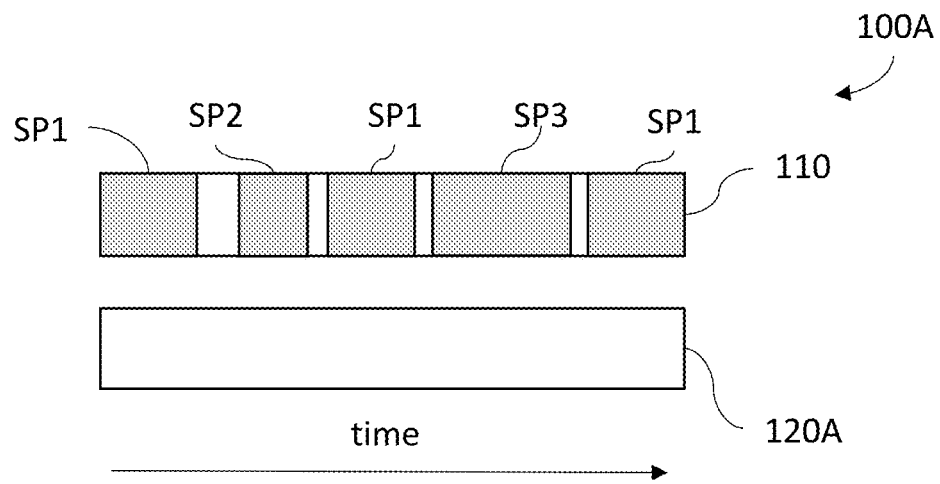
FIGS. 1A and 1B show exemplary situations of conference calls.

It is to be understood that the figures and descriptions of the present invention may have been simplified to illustrate elements that are relevant for a clear understanding of the present invention. It is also to be understood that the drawings included herewith only provide diagrammatic representations of the presently preferred structures of the present invention and that structures falling within the scope of the present invention may include structures different than those shown in the drawings. It is also to be understood that the invention is not limited in its applications to the details of the particular arrangements shown since the invention is capable of other embodiments. Also, the terminology used herein is for the purpose of description and not of limitation. In the Summary above and in the Detailed Descriptions and in the accompanying drawings, reference is made to particular features of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Metadata is a type of data that provides information about other data that may include content data. In audio recording during audio processing such as phone calls, audio/video conference and voicemail, metadata related to the audio processing may be generated and stored for future references. The information in the metadata may include start time and end time of the audio processing, identifications of users or speaker who attend the conversation, personal information such as speakers' phone numbers, and locations of the speakers. The metadata may be used to create voiceprints that may include characteristics of voice that uniquely identify an individual, and may be used for analyses of audio processing later. The metadata may be stored internally in recording devices, data repository systems coupled to the recording devices, or systems that include audio recording and management capabilities. Alternatively, the metadata may be stored in external storages such as servers or databases in remote locations.

For some instances, however, recording of audio processing may be performed without generating metadata associated with the audio processing, or recording of audio processing may begin before metadata is generated. In this situation, even though the audio processing such as conversations or audio/video conferences is recorded, analyses of the recoded audios may not be complete because of lack of information such as identifications of speaks, places where the conversation took place, and emotions of speakers.

The disclosed invention provides system and method to reconstruct or restore metadata of audio processing which has missing metadata entirely or partially. For this purpose, the system and method of the disclosed invention employ technique that reconstructs metadata for audio outputs that has absent metadata. The system and method of the disclosed invention may provide standard audio files with more metadata definition such as who is speaking, transcripts, emotional analysis, etc. to enhance static audio files by creating rich information media records. The system and method of the disclosed invention work on any audio output such as a voicemail or in an environment where the initial identification of people is beneficial once a recording is made. Applications of the disclosed invention are limitless, and recorded audio output may be used as a means to generate in depth metadata for the audio output. For example, voiceprints may be used to identify speakers individually. Therefore even indistinct recordings of audio output without metadata can be transformed into useful audio recordings by reconstructing metadata of the indistinct recordings. The system and method of the disclosed invention may be used for real-time calls so that call information, such as caller identification and call duration, is updated and the metadata construct is populated as a voice call progresses.

Figure 1B:
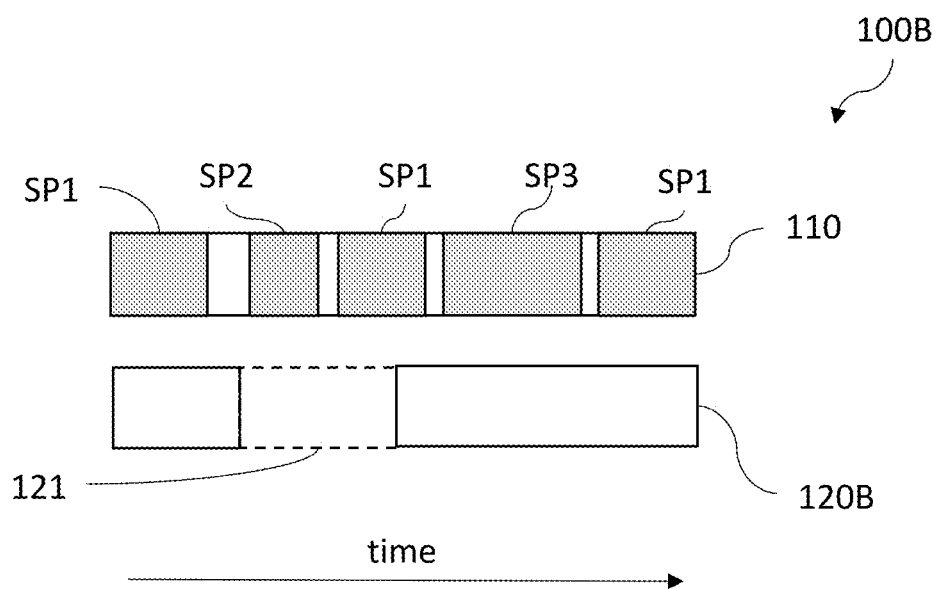

With reference to FIGS. 1A and 1B, shown are exemplary situations of conference calls 100A and 100B, respectively, in which three speakers SP1, SP2 and SP3 are involved. An audio stream or output 110 is processed or recorded. Gray areas in the audio stream 110 illustrates periods in which a speaker SP1, SP2 or SP3 speaks. FIG. 1A shows metadata 120A that is generated all the time during the audio processing. Metadata 120A, which is associated with the audio output 110, are generated during the entire audio processing. FIG. 1B shows metadata 120B that are partially generated during the audio processing. The metadata 120B has a time period 121 during which metadata is not generated. If this audio stream 110 is recorded, the time period with no metadata 121 may prevent a complete analysis of the audio stream 110 later, or may cause incorrect analysis of the audio stream 110. As shown in FIG. 1B, for example, while the speaker SP2 is speaking, the metadata is not constructed. In the analysis of the recorded audio output 110 later, the speaker SP2 may not be identified, or the analysis may lead to a conclusion that the speaker SP2 has not attended the conference call 100B. As illustrated in the example above, analysis without metadata may be a challenge because of the lack of information about the audio outputs. In this or similar situations, the system and method of the disclosed invention may be used to reconstruct metadata for the period 121 in which metadata is missing.

The system and method of the disclosed invention for reconstructing metadata utilize algorithms or processes to extract audio data from audio outputs that are provided by audio sources to construct metadata. The audio data may include information or characteristics of speakers, transcript, sentiment analysis, language spoken, etc. The method of the disclosed invention may be applied to an existing recording, where the audio output once analyzed may produce data that can lead to the reconstruction of metadata. Alternatively, the method of the disclosed invention may be applied in real time calls or audio conferences.

The method of the disclosed invention reconstructs metadata by transcribing audio outputs such as voice streams, by separating speakers, and then by applying machine learning to correlate metadata to a specific speaker. The process adds information that would otherwise be missing from the transcribed audio output file. Furthermore, extra data extracted from audio files, while metadata is reconstructed, may be stored in a database for the purposes of leveraging customer relationship management (CRM) type applications. The extracted data and reconstructed metadata may also be utilized to be adapted for language translations or for other utilities such as call suppression when a speaker's identity once derived from an audio file triggers, for example, General Data Protection Regulation (GDPR) compliance.

When an audio output file is produced through audio capturing processes with absent metadata, the method of the disclosed invention applies processes to reconstruct the missing metadata. These processes may include detecting characteristics of the speaker and producing output based on those learned characteristics. The metadata builder is a component within the process that may apply different methods to reconstruct the missing metadata. If the audio from a recording is analyzed and then associated with voiceprints that are stored in a database, speaker may be recognized and identified, which means that each indistinct speaker in the audio output file can be identified and the transcript can then be precisely annotated (tagged) for each speaker. Other steps may include processes such as analyzing transcript using natural language processing (NLP) techniques to generate sentiment bias. In this case, sentiment (i.e. emotional) analysis is an additional metadata point that can be associated with each segment of the original audio file or tags within the transcript. Furthermore, the transcript can be translated, in which case the reconstructed metadata based on an original first language can provide alternate languages through one or more of the output formats.

Figure 2:
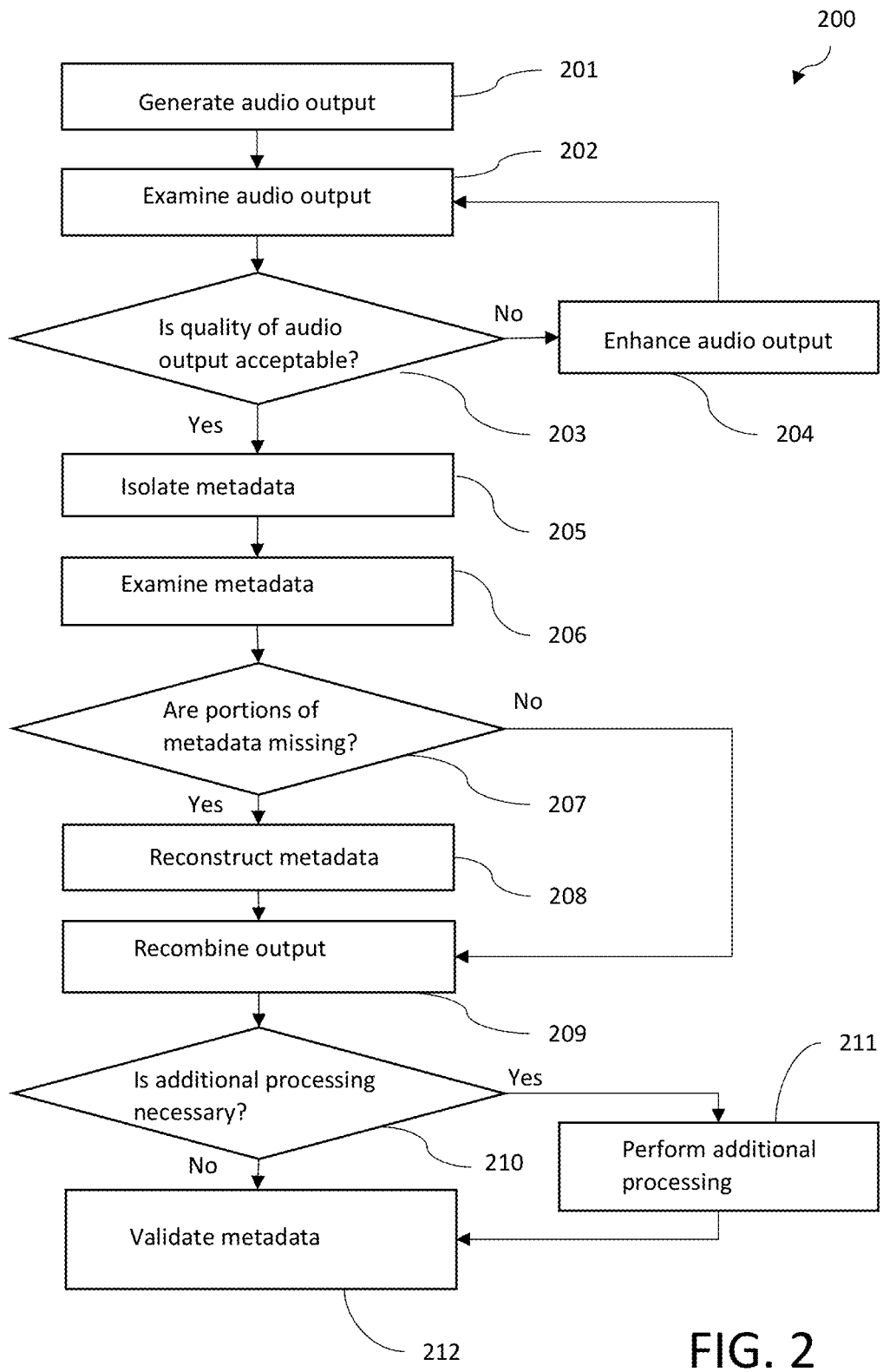
FIG. 2 shows a workflow diagram to reconstruct metadata for audio output that includes missing portions of metadata.

With reference to FIG. 2, shown is an embodiments of a method 200 to reconstruct metadata for audio output that includes missing portions of metadata. In order to reconstruct the metadata, an audio output is generated, block 201. The audio output may be generated by an audio capturing devices connected to audio sources, and may be stored at one or more storage media as audio files. The audio output is examined to check if the audio output is suitable for metadata analysis and restoration, block 202. An audio quality score, which may represent quality of the audio output, may be used to evaluate the quality of the audio output. In order to calculate the audio quality score, the audio output may be transcribed to create a transcript. However, the quality of the audio output may be evaluated with any known methods. If the audio quality score is below a predetermined value or the quality of the audio output is not acceptable for metadata analysis, block 203, the audio output may be enhanced, block 204. Any known method may be used to enhance the audio output. When the quality of the audio output is improved to be suitable for metadata analysis, metadata of recorded conversations of the audio output is detected and is isolated from the audio output, block 205. The isolated metadata may be separated from the audio output. The isolated metadata is examined to determine whether the metadata have any missing portions, block 206. If the metadata have missing portions, block 207, the metadata is reconstructed to properly restore missing metadata, block 208. In the reconstruction of metadata, absent fields of the metadata, which may be the missing portions of the metadata, may be added or filled with information constructed through the metadata reconstruction processes. The missing portions of the metadata may be replaced with constructed metadata. The steps for reconstructing metadata are further described referring to FIG. 3. If the metadata do not have any missing portions, the metadata is recombined with the audio output, block 209. However, the metadata may be further enhanced to include more information of the audio output, which is described referring FIG. 4.

Once the metadata is reconstructed, the metadata is recombined with the recorded conversations of the audio output to produce reconstructed recorded conversations, block 209, producing reconstructed audio output that includes reconstructed metadata. The reconstructed audio output is examined to check if additional processing is necessary for certain applications. If additional processing is necessary, block 210, the method applies additional processing to the reconstructed audio output, block 211. In this step, more information related to the audio output may be added to the metadata. Once the audio output and the metadata are enhanced through the additional processing 211, the metadata is validated for future reference and other applications, block 212. The validated metadata may be stored in external databases for other applications such as CRM applications.

Figure 3:
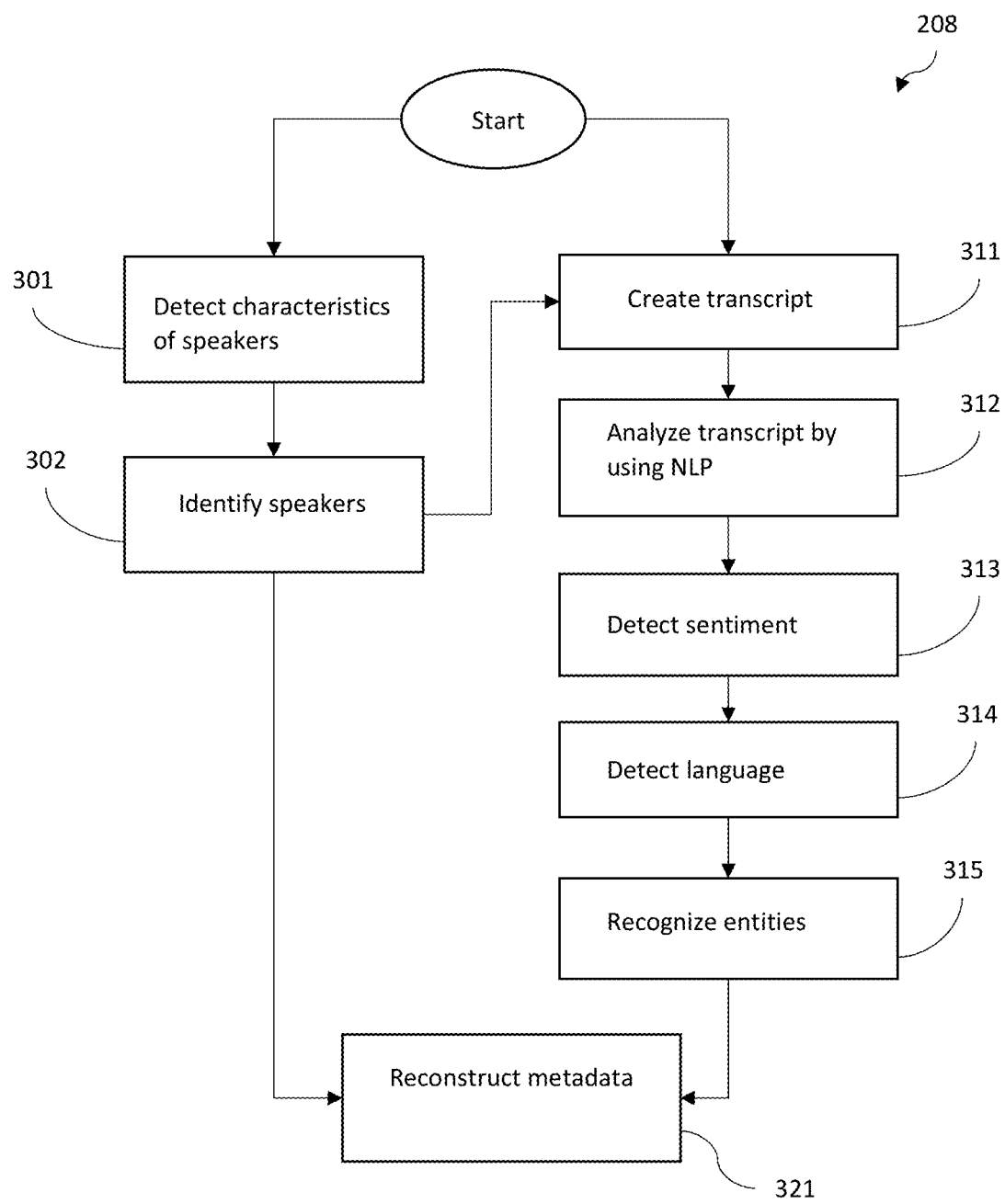
FIG. 3 shows a workflow diagram for step 208 shown in FIG. 2.

With reference to FIG. 3, shown is a workflow diagram for step 208 shown in FIG. 2, which includes a method to reconstruct missing metadata. The method includes detecting characteristics of speakers, block 301. Once the characteristics of the speakers are detected, the speakers are identified, block 302. In this step, voiceprints of speakers may be used to identify the speakers with the detected characteristics of the speakers in the audio output. The voiceprints may be retrieved from one or more databases that store the voiceprints of speakers or users. The one or more databases may be located remotely or located internally in the metadata reconstruction system. The voice prints are retrieved by the metadata reconstruction system to identify speakers. If the databases are located remotely, the metadata reconstruction system may communicate with the databases through a network. A voiceprint is a set of measurable characteristics of a human voice that uniquely identifies an individual. These characteristics may be expressed as a mathematical formula, and may include audio characteristics such as frequency, amplitude and duration. When the audio output is analyzed and is associated with voiceprints that are stored in a database, speakers may be identified by matching characteristics of the audio output with voiceprints, which means that each indistinct speaker in the audio output can be identified. Machine learning processes may be further applied to correlate metadata to specific speaker. Once the speakers are identified, the transcript may be precisely annotated (tagged) for each speaker.

In order to further process the reconstruction of missing metadata, a transcript of the audio output may be created, block 311. The transcript may be created referring to the identifications of the speakers that is generated in step 302. As the speakers are identified in step 302, the transcript may be annotated with the identified speakers. The transcript is further analyzed by using NLP, block 312, to detect more information such as sentiment, block 313. NLP utilizes different techniques to interpret human languages. For example, NLP breaks down language into elementary pieces, and constructs relationships between the pieces and explores how the pieces work together to create meaning. NLP has the capability to provide content categorization such as search and indexing, contextual extraction in which structured information from texts is extracted, sentiment analysis in which mood may be identified from texts, and topic modeling in which meaning in text collections may be captured.

The transcript may be further analyzed to collect more information such as to detect language, block 314, and to recognize entities, block 315. The entities may include names and personal information of the speakers such as phone numbers and/or addresses. Based on the recognized entities, speakers' profiles such as contact information may be updated. The identifications of speakers constructed in step 302 and the data obtained through analysis of transcripts in steps 312-315 are used to reconstruct missing metadata, block 321. Absent fields of the metadata, which is the missing portions of the metadata, may be filled or added with information constructed through steps shown in FIG. 3.

The transcript is annotated with identified speakers, and more information of the speakers (entities) are added to the metadata.

Figure 4:
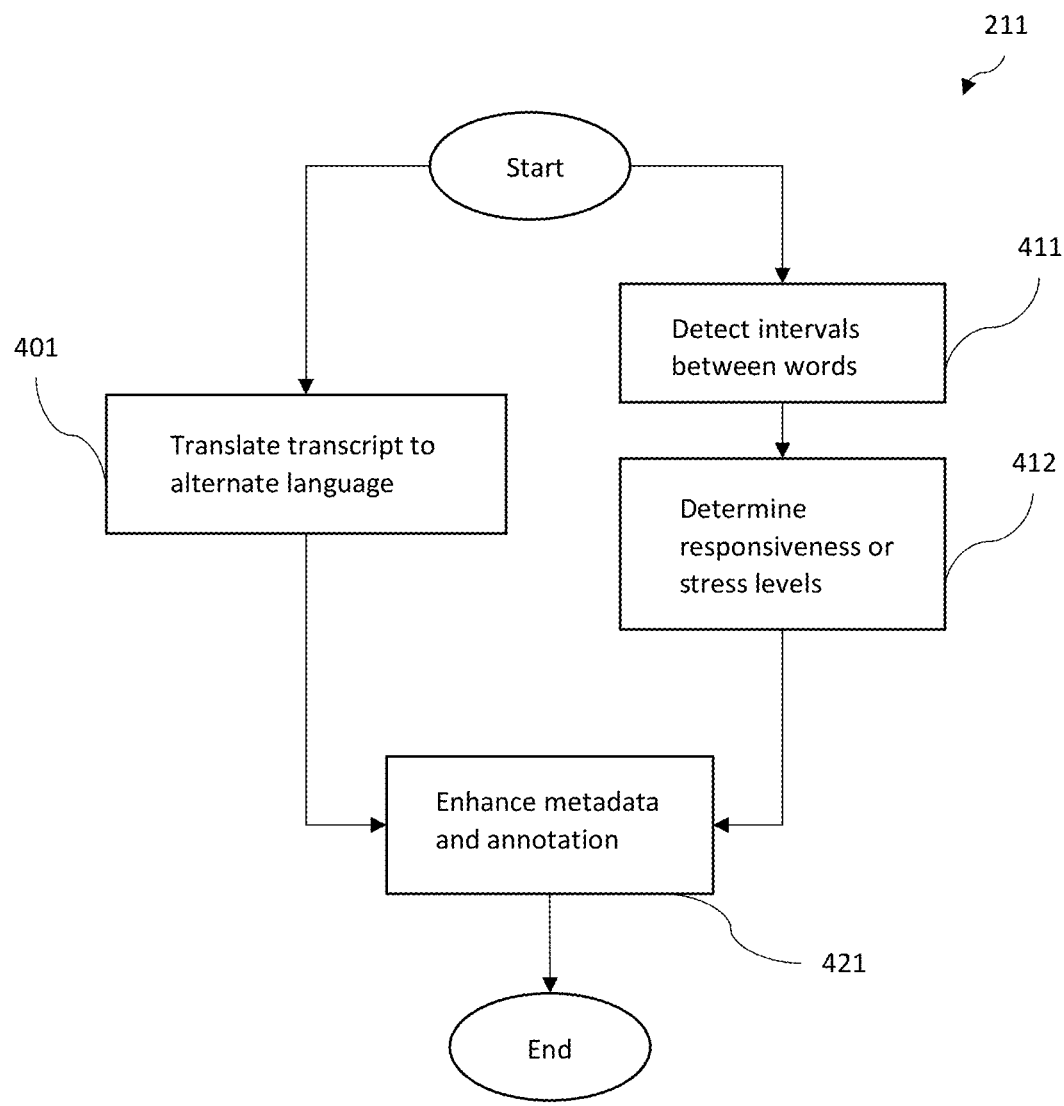
FIG. 4 shows a workflow diagram for step 211 shown in FIG. 2.

With reference to FIG. 4, shown is a workflow diagram for step 211 shown in FIG. 2, which are to perform additional processes that may be necessary for the reconstructed audio output. These processes may include translation of the transcript to alternate language, block 401, detection of intervals between words, block 411, and determining responsiveness or stress levels of speakers, block 412. These analyses in steps 411 and 412 may be used to further enhance the reconstructed metadata. Through these steps, the reconstructed metadata and annotation are enhanced, block 421. Once the reconstructed metadata is enhanced, the metadata may be stored in databases for further applications. For example, the reconstructed and enhanced metadata may be used to apply call controls or recording controls such as voice suppression or transcript suppression when these controls are required.

Figure 5:
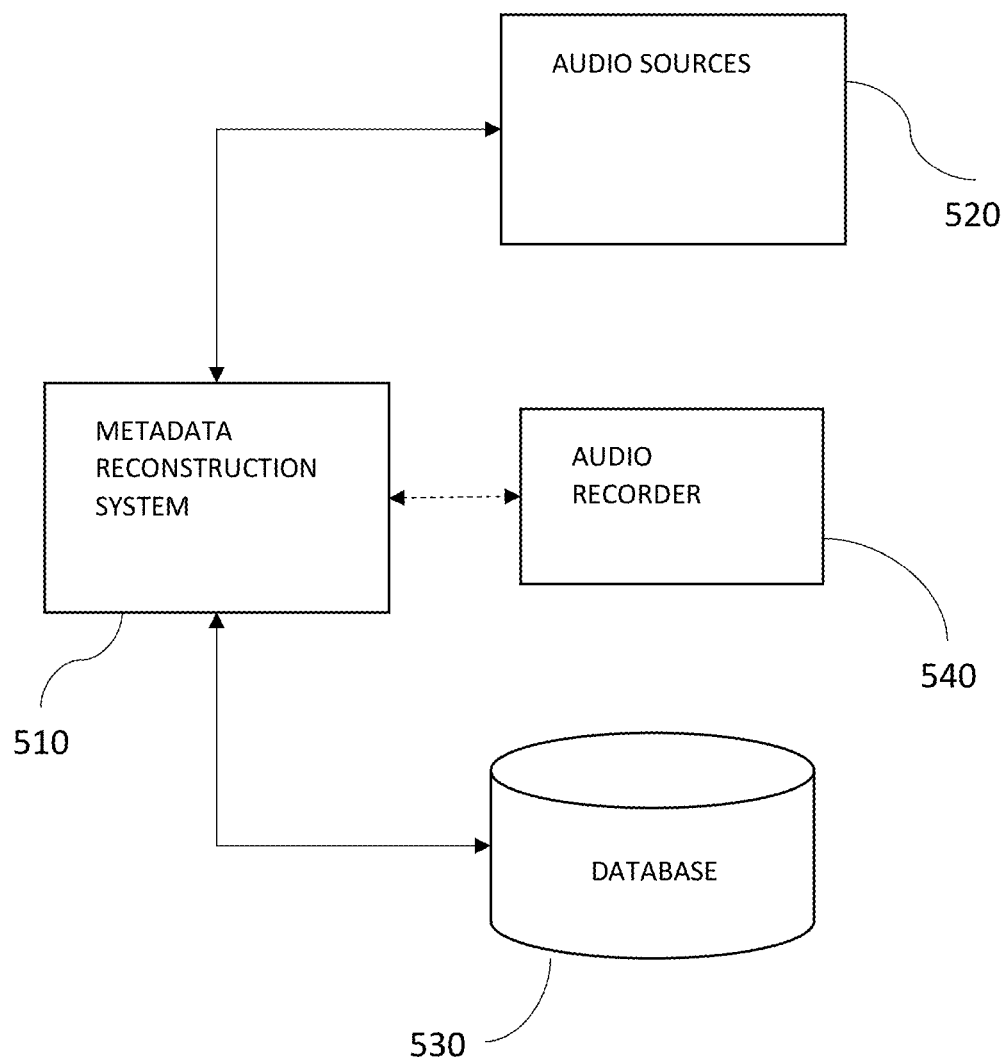
FIG. 5 shows a diagram illustrating a metadata reconstruction system coupled to audio sources and database.

With reference to FIG. 5, the disclosed invention provides a metadata reconstruction system 510 that communicates with one or more audio sources 520 and one or more databases 530. The metadata reconstruction system 510 may also communicate with audio recorder 540 if necessary. The one or more audio sources 520 include hardware (systems or devices) that is capable of producing or processing audios. Examples of the audio sources include but are not limited to phone systems for real time voice calls, video/audio conference systems for video/audio conferences involving multiple speakers in real time, audio systems that can play back recorded audios, and storage media such as hard disk driver and memories which can stores audio files. The recorded audios may include voice mails, recorded video/audio conferences, and any recorded voices of speakers. The audio recorder 540 records audio outputs from any types of audio sources that may include sound in indoor and outdoor environment. The audio recorder 540 may have a storage medium or memories to store the recorded audios. The database 530 stores voiceprints of users (speakers). Voiceprints in the database 530 are retrieved by the metadata reconstruction system 510 to identify the speakers in the audio output. The database 530 may store other information of users that may be retrieved by the metadata reconstruction system 510 to perform additional processing (block 211 in FIG. 2). The other information of users may include users' profiles, contact information, and personal information attributable to the speakers.

In one embodiment, the metadata reconstruction system 510 interacts with the audio sources 520 to retrieve the recorded audio stored in the audio sources. In another embodiment, the metadata reconstruction system 510 interacts with the audio sources 520 to directly retrieve audio outputs in real time. This embodiment enables construction of metadata in real time during voice call or audio conferences. Voiceprints may be retrieved from databases in real time during the voice call or call conferences to identify speakers, and the audio output may be transcribed to produce a transcript in real time. The transcript may be further analyzed using NLP in real time. Optionally, the metadata reconstruction system 510 may include an internal audio capturing element 515 shown in FIG. 6 to store the audio output from the audio sources 520 while the audio output is processed to construct metadata.

Figure 6:
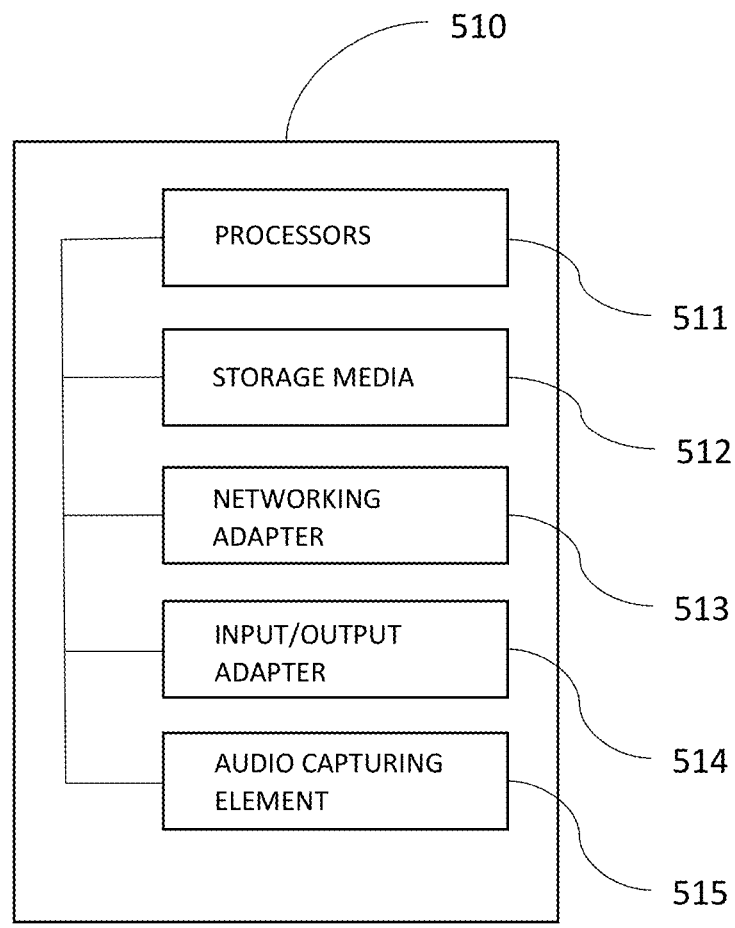
FIG. 6 shows a diagram illustrating hardware elements of the metadata reconstruction system.

With reference to FIG. 6, the metadata reconstruction system 510 includes one or more storage media 512 that may include memories and/or hard disk drives. The storage media 512 stores software or computer programs including instructions that perform operations to construct metadata when executed by one or more processors 511. The operations have functionalities to examine audio outputs that are retrieved from the audio sources 520, and to reconstruct metadata of the audio output if the audio output has missing portions of metadata. As described above, the operations may include isolating the metadata of the audio output, detecting missing portions of the metadata from the isolated metadata, detecting characteristics of speakers involved in the audio output, identifying the speakers from the characteristics of the speakers by utilizing voiceprints of speakers, creating a transcript of the audio output, analyzing the transcript with NLP, annotating the transcript with identified speakers, constructing metadata with the identified speakers and results of the analysis of the transcript, and recombining the constructed metadata with the audio output to produce reconstructed audio output.

The metadata reconstruction system 510 may further include input/output adapter 514 to communicate with the audio sources 520 and the external audio recorder 540. The metadata reconstruction system 510 may include an internal audio capturing element 515 such as audio recorder to capture audio streams from the audio sources 520 if this capturing is desired. The metadata reconstruction system 510 may store the recorded audio streams in one of the storage media 512. The metadata reconstruction system 510 includes a networking adapter 513 to communicate with one or more databases or other external systems. As described above, in the process of reconstructing missing metadata, the metadata reconstruction system 510 may interact with one or more databases 530 that store voiceprints and additional data of speakers such as speakers' phone numbers. The metadata reconstruction system 510 detects characteristics of speakers in the audio output, and then may access voiceprints stored in the databases 530 to match characteristics of the audio output with voiceprints. Voiceprints may be used to identify the speakers with the characteristics of the speakers. Accessing the database through the networking adapter 513 may be performed wirelessly or with wires. The metadata reconstruction system 510 may be connected to audio sources 520 and/or the audio recorder 540 wirelessly or with wires.

The terms and descriptions used herein are set forth by way of illustration only and are not meant as limitations. Those skilled in the art will recognize that many variations are possible within the spirit and scope of the invention and the embodiments described herein.

What is claimed is:

1. A system for reconstructing metadata of an audio output that is output from one or more audio sources, the metadata reconstruction system coupled with the one or more audio sources and one or more databases including voiceprints of users, comprising:
   at least one non-transitory storage medium to store executable instructions; and
   at least one processor to execute the executable instructions that cause the at least one processor to perform operations to reconstruct the metadata of the audio output, the operations comprising:
   isolating the metadata of a recorded conversation of the audio output;
   detecting missing portions of the metadata of the audio output from the isolated metadata;
   detecting characteristics of speakers involved in the audio output;
   identifying each of the speakers involved in the audio output from the characteristics of the speakers in the audio output by utilizing stored voiceprints of speakers, wherein the voiceprints are expressed as mathematical formula that include frequency, amplitude and duration audio characteristics;

creating a transcript of the audio output;

analyzing the transcript by using natural language processing (NLP), wherein the analyzing with NLP breaks down and interprets language used in the transcript;

annotating the transcript with identified speakers so that the transcript includes a tag for each identified speaker;

constructing metadata with the identified speakers and results of the analysis of the transcript, wherein the missing portions of the metadata are replaced with the constructed metadata; and combining the isolated metadata and the constructed metadata with the audio output to produce reconstructed recorded conversation, whereby the constructed metadata replaces the missing portions of the isolated metadata.

2. The metadata reconstruction system of claim 1 wherein the audio output is a recorded audio stream.

3. The metadata reconstruction system of claim 1 wherein the audio output is an audio stream produced in real time by the one or more audio sources.

4. The metadata reconstruction system of claim 1 wherein the audio output is an audio stream produced in non-real time by the one or more audio sources.

5. The metadata reconstruction system of claim 1 wherein the identifying the speakers comprises:

accessing the one or more databases to retrieve the voiceprints of users; and matching the characteristics of the speakers in the audio output with the voiceprints.

6. The metadata reconstruction system of claim 1 wherein the characteristics of the speakers include frequencies, amplitudes and durations of voices of the speakers.

7. The metadata reconstruction system of claim 1 wherein the analyzing the transcript comprises detecting sentiments of the speakers by using the NLP.

8. The metadata reconstruction system of claim 1 wherein the operation further comprises detecting intervals between words in the audio output for each speaker to determine responsiveness and stress level of the speaker.

9. The metadata reconstruction system of claim 1 wherein the operation further comprises detecting languages of the audio output.

10. The metadata reconstruction system of claim 1 wherein the operation further comprises recognizing entities that includes names and personal information attributable to the speakers.

11. A method for reconstructing metadata of an audio output that is output from one or more audio sources, comprising:

isolating the metadata of a recorded conversation of the audio output;

detecting missing portions of the metadata of the audio output from the isolated metadata;

detecting characteristics of speakers involved in the audio output;

identifying each of the speakers involved in the audio output from the characteristics of the speakers in the audio output by utilizing stored voiceprints of speakers, wherein the voiceprints are expressed as mathematical formula that include frequency, amplitude and duration audio characteristics;

creating a transcript of the audio output;

analyzing the transcript by using natural language processing (NLP), wherein the analyzing with NLP breaks down and interprets language used in the transcript;

annotating the transcript with identified speakers so that the transcript includes a tag for each identified speaker;

constructing metadata with the identified speakers and results of the analysis of the transcript, wherein the missing portions of the metadata are replaced with the constructed metadata; and combining the isolated metadata and the constructed metadata with the audio output to produce reconstructed recorded conversation, whereby the constructed metadata replaces the missing portions of the isolated metadata.

12. The method of claim 11 wherein the audio output is a recorded audio stream.

13. The method of claim 11 wherein the audio output is an audio stream produced in real time by the one or more audio sources.

14. The method of claim 11, wherein the audio output is an audio stream produced in non-real time by the one or more audio sources.

15. The method of claim 11 wherein the identifying the speakers comprises:

connecting to one or more databases to access voiceprints of users stored in the one or more databases; and matching characteristics of the speakers in the audio output with the voiceprints.

16. The method of claim 11 wherein the characteristics of the speakers include frequencies, amplitudes and durations of voices of the speakers.

17. The method of claim 11 wherein the analyzing the transcript comprises detecting sentiments of the speakers by using the NLP.

18. The method of claim 11, further comprising detecting intervals between words in the audio output for each speaker to determine responsiveness and stress level of the speaker.

19. The method of claim 11, further comprising detecting languages of the audio output.

20. The method of claim 11, further comprising recognizing entities that includes names and personal information attributable to the speakers.

* * * * *